Aug. 14, 1928.  
J. COYLE  
1,681,101  
APPARATUS FOR TREATING FOOD PRODUCTS IN CLOSED CONTAINERS  
Filed Oct. 20, 1926  9 Sheets-Sheet 1

Inventor  
John Coyle  
By Sturtevant & Mason  
Attorneys

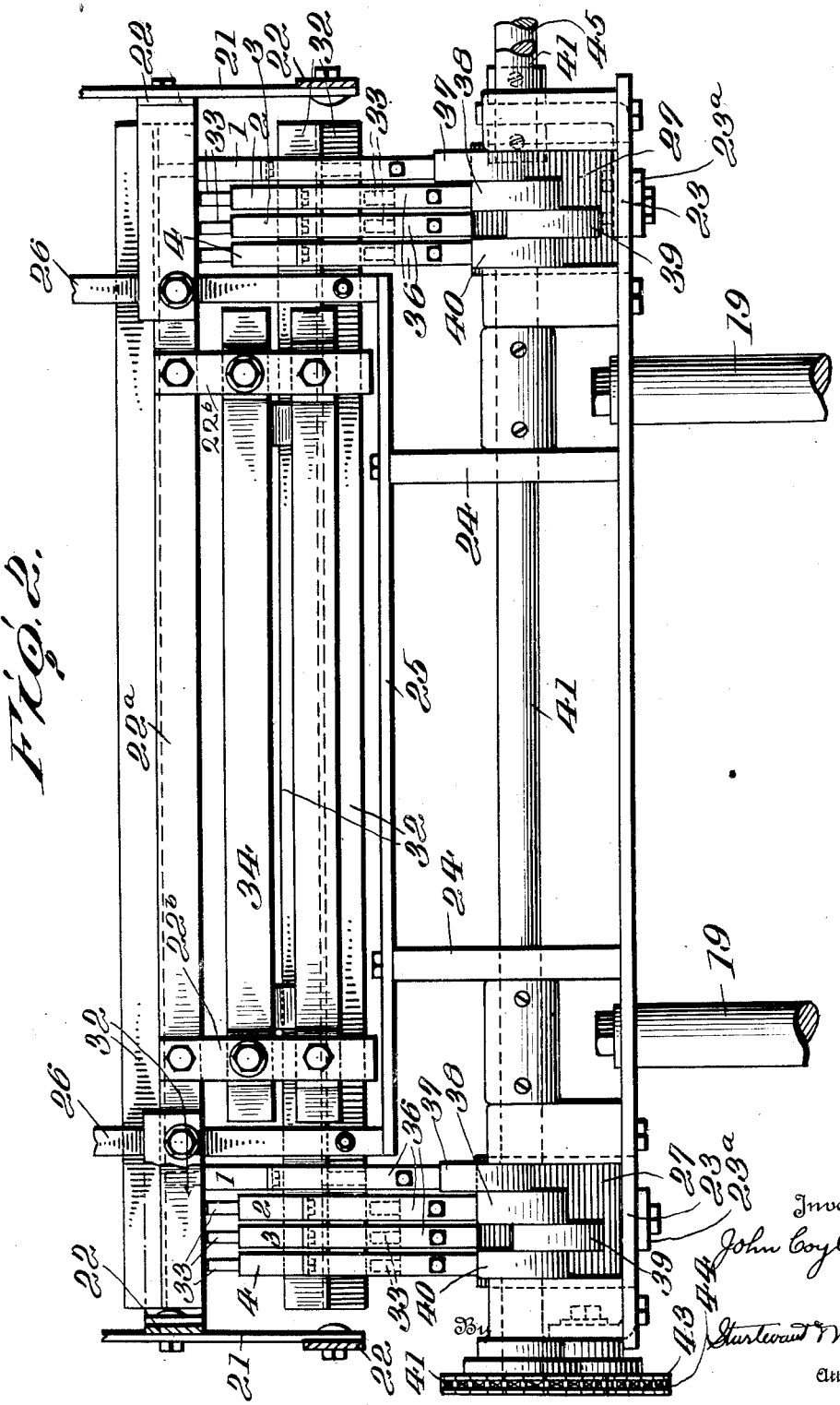

Aug. 14, 1928.  J. COYLE  1,681,101
APPARATUS FOR TREATING FOOD PRODUCTS IN CLOSED CONTAINERS
Filed Oct. 20, 1926   9 Sheets-Sheet 3
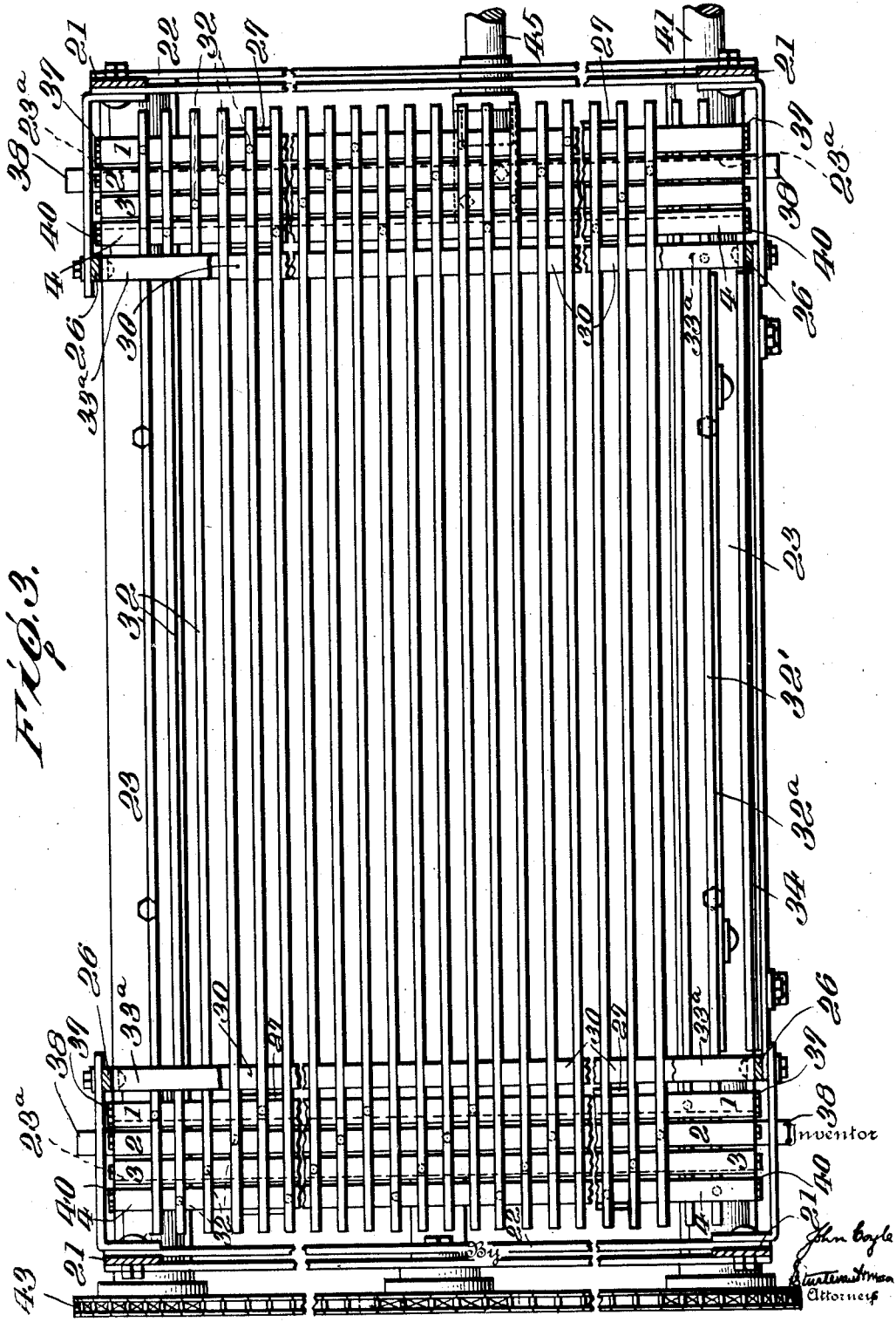

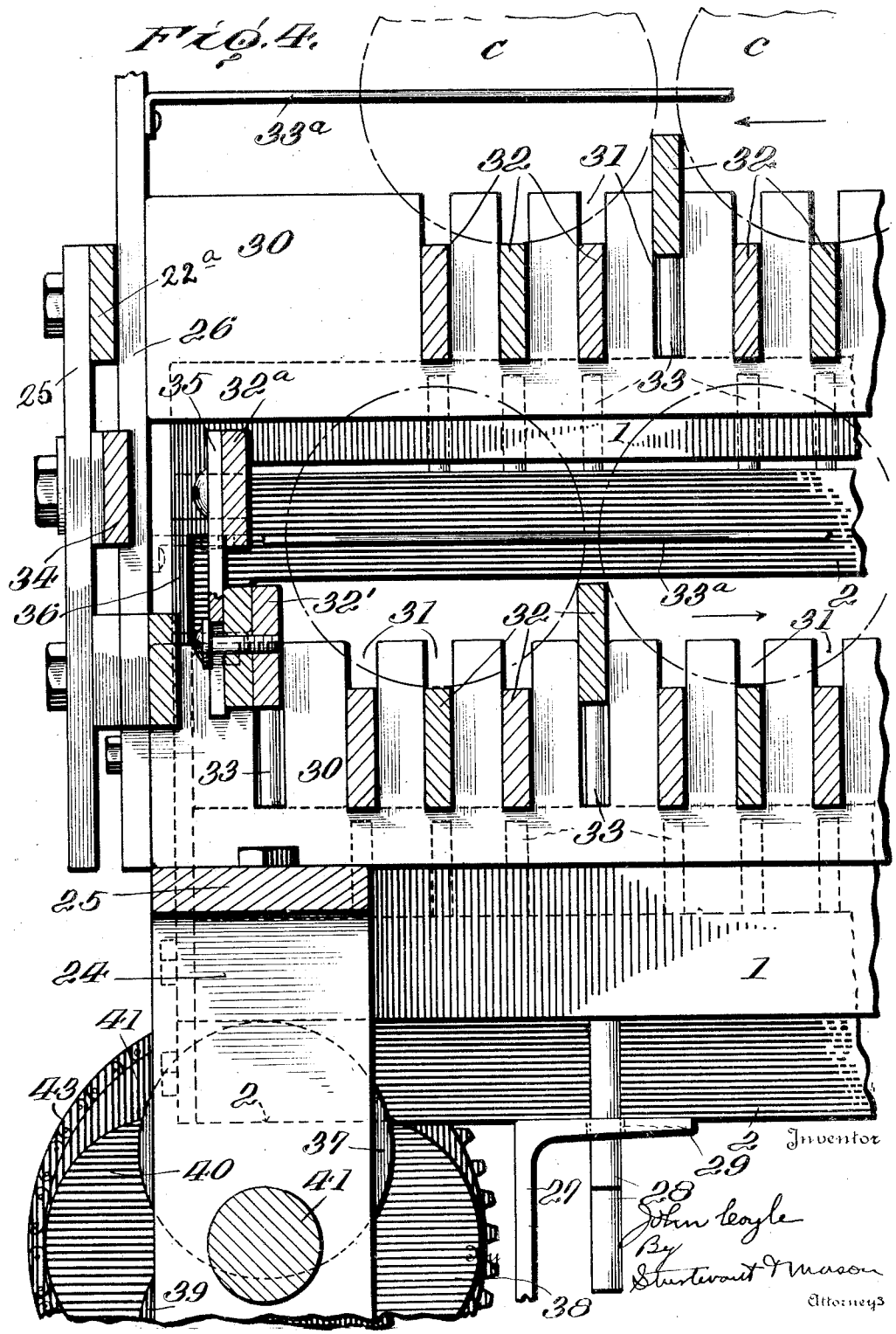

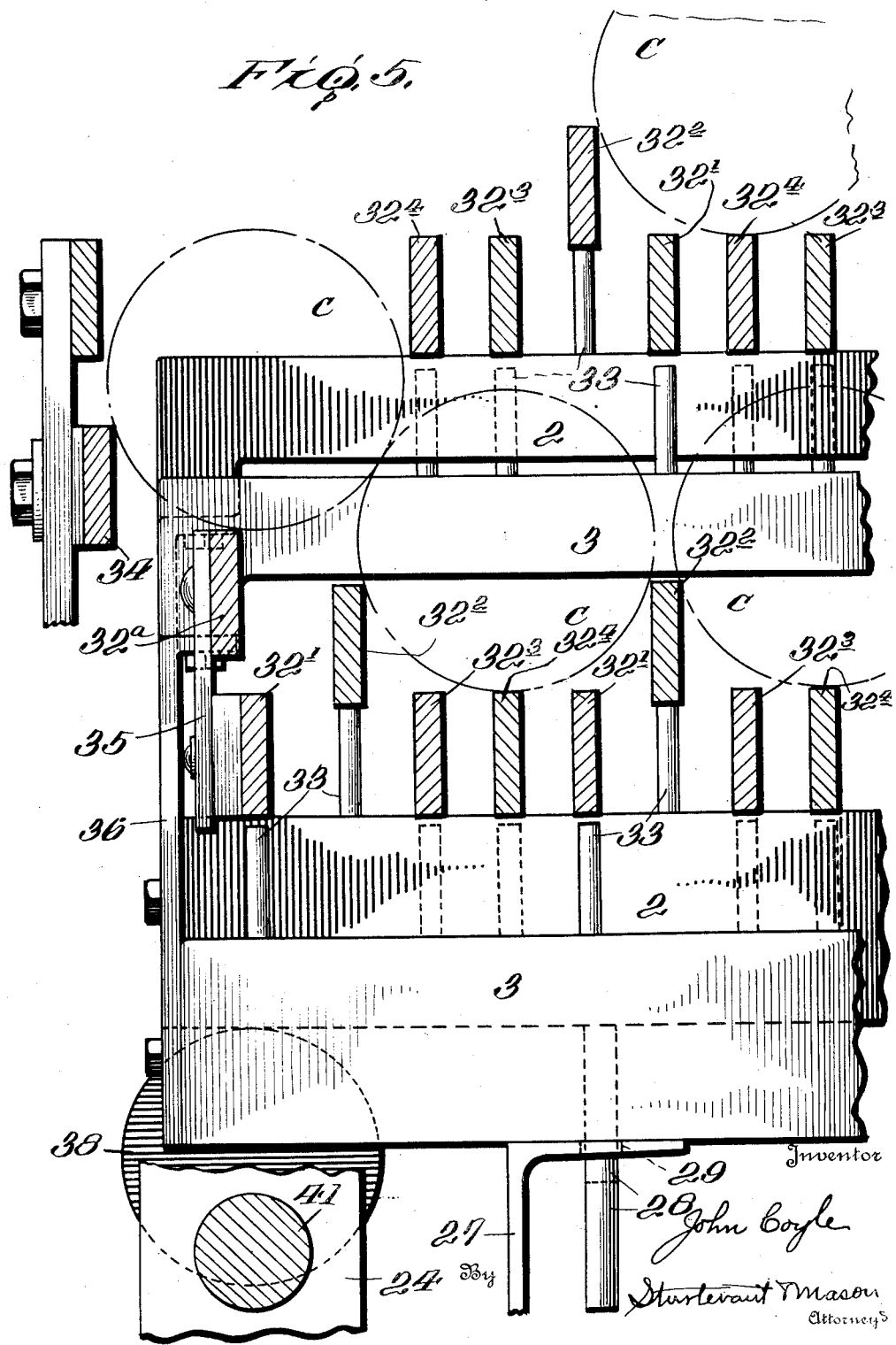

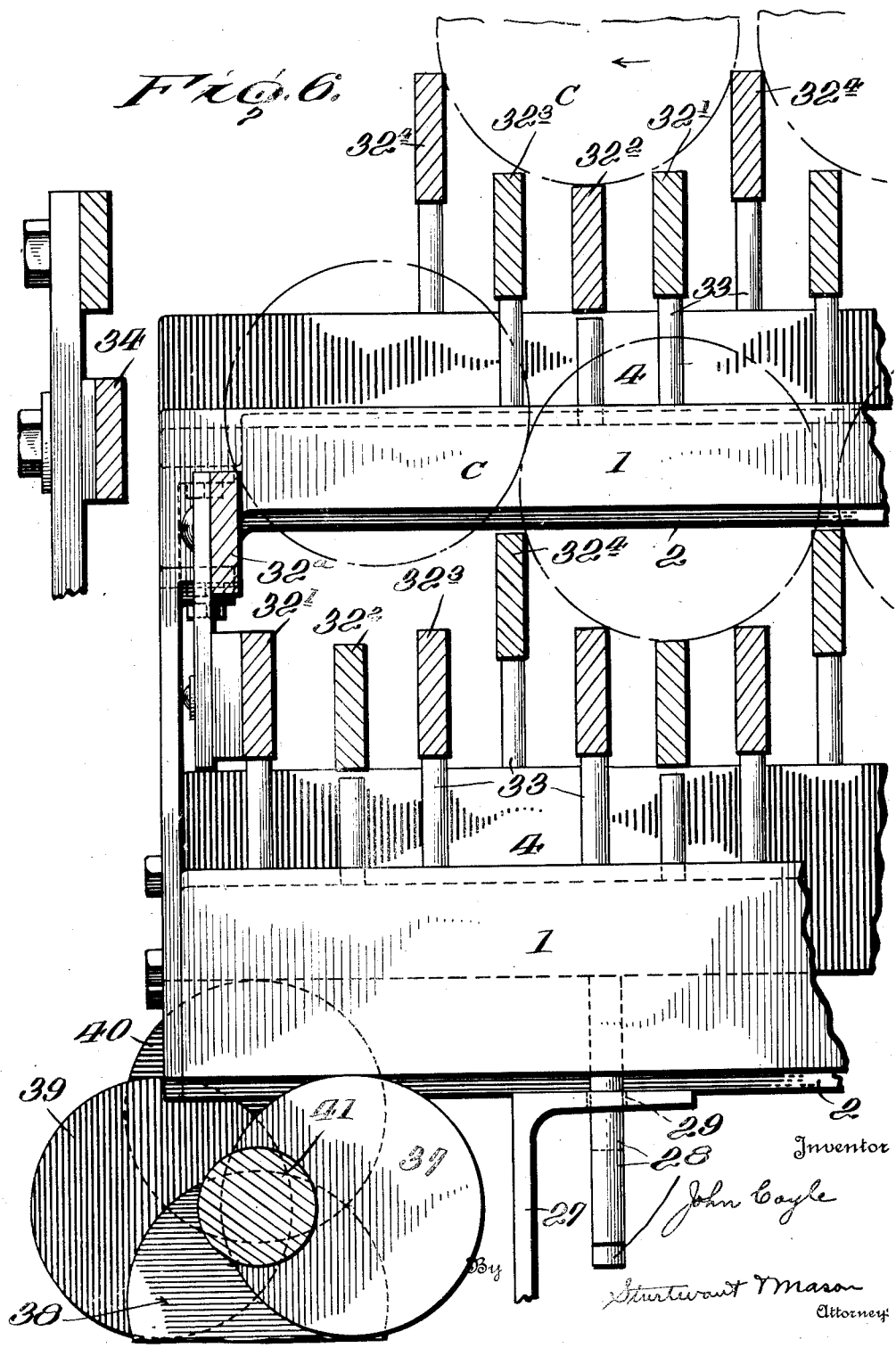

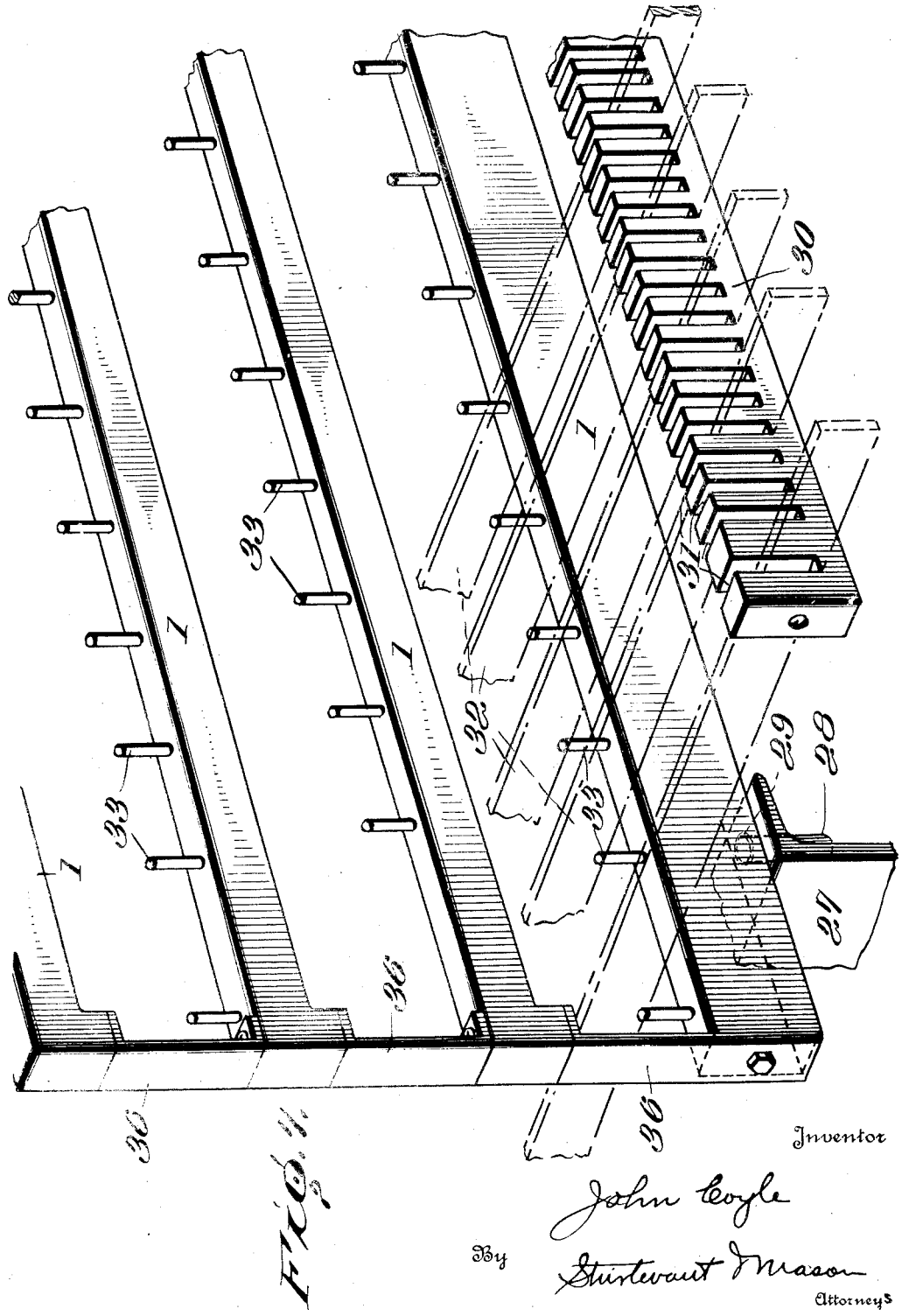

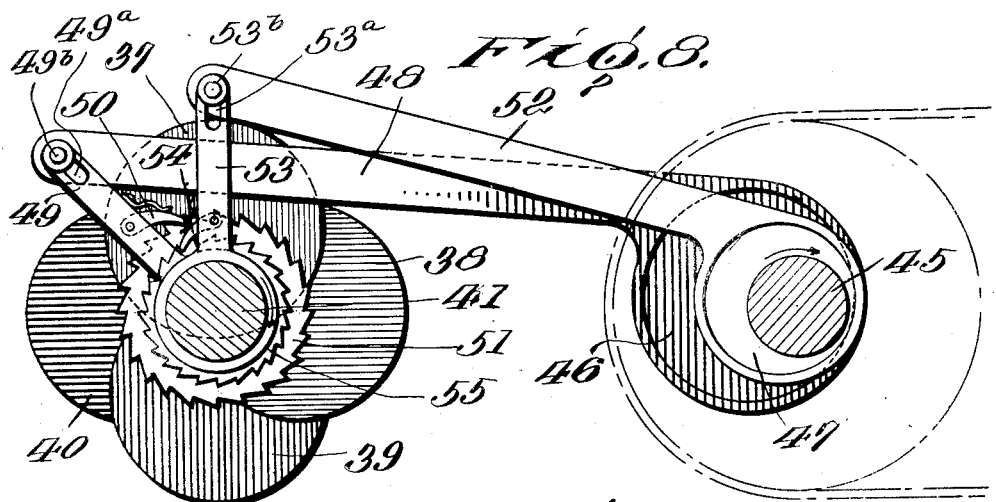
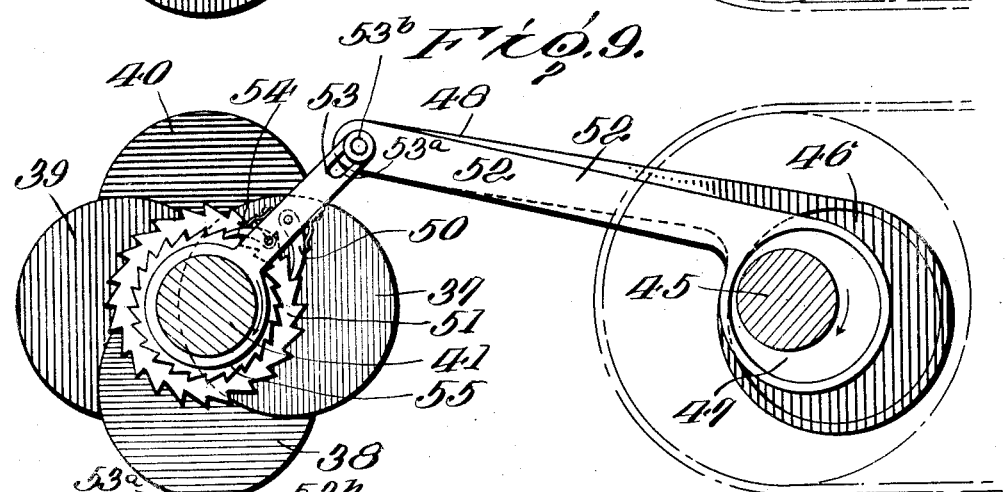
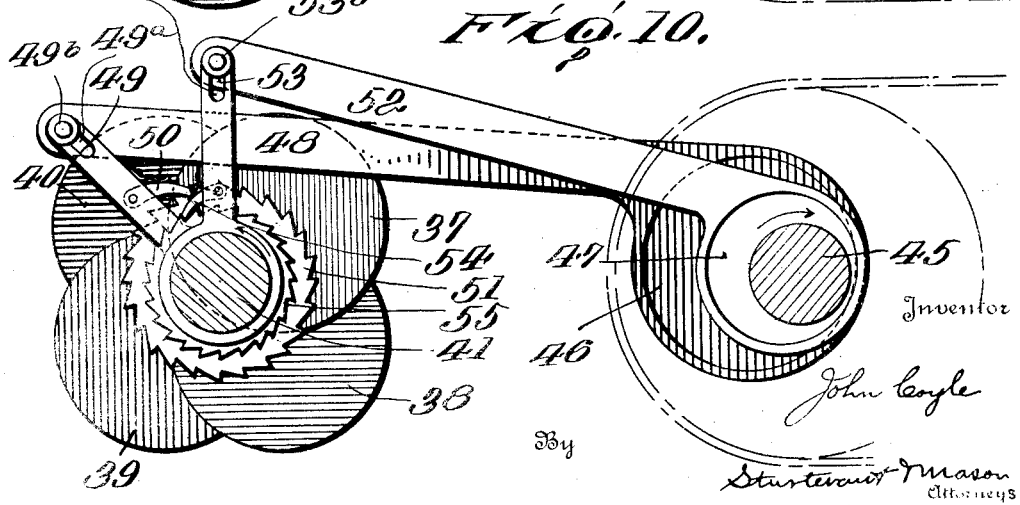

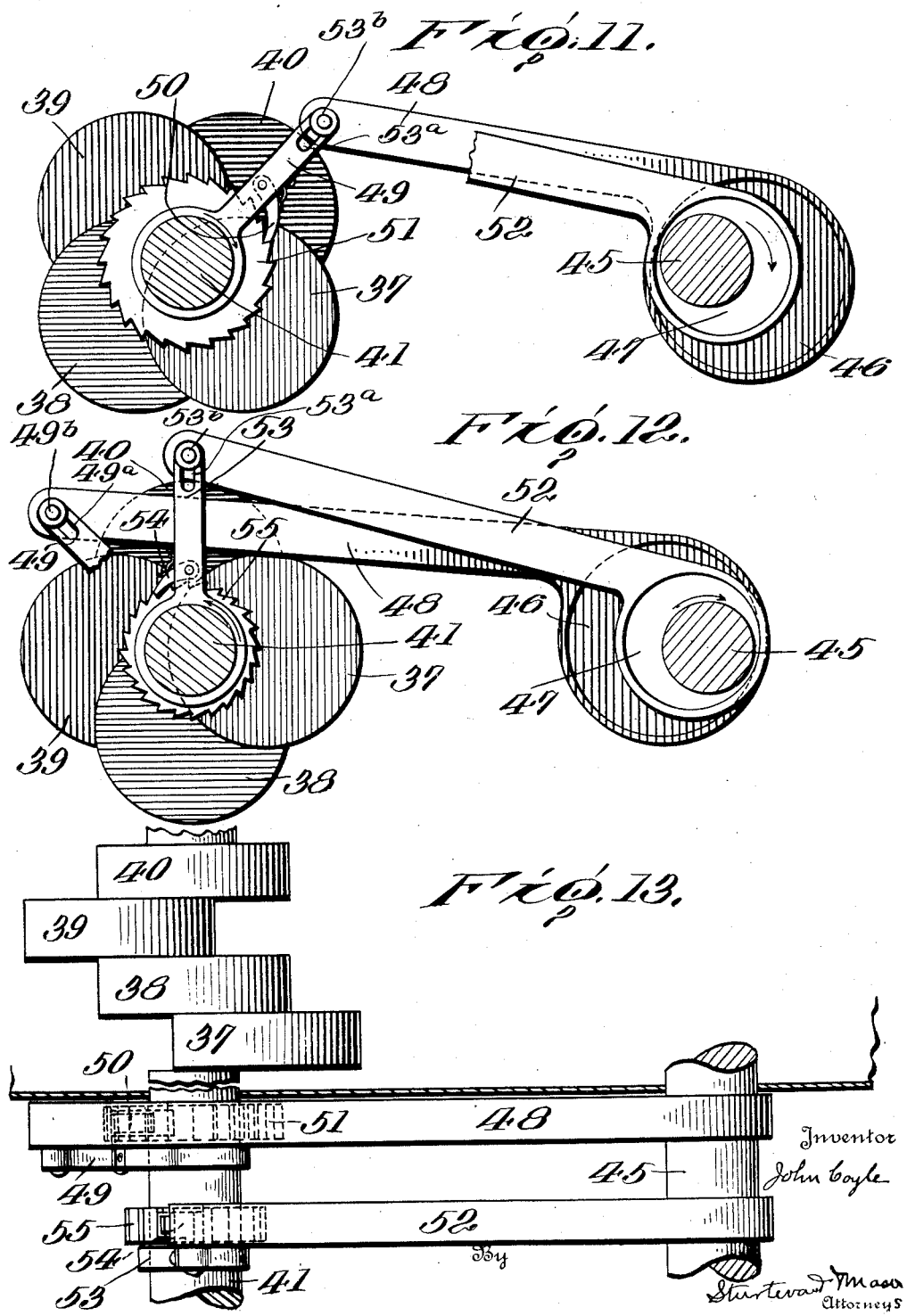

Patented Aug. 14, 1928.

1,681,101

UNITED STATES PATENT OFFICE.

JOHN COYLE, OF BALTIMORE, MARYLAND, ASSIGNOR TO CONTINENTAL CAN COMPANY, INC., OF NEW YORK, N. Y., A CORPORATION OF NEW YORK.

APPARATUS FOR TREATING FOOD PRODUCTS IN CLOSED CONTAINERS.

Application filed October 20, 1926. Serial No. 143,010.

The invention relates to new and useful improvements in an apparatus for treating food products in closed containers.

An object of the invention is to provide a conveying mechanism for containers containing food products, wherein the containers are moved forward and then backward, but to a greater extent in a forward direction for agitating the contents of the container and conveying it through the apparatus.

A further object of the invention is to provide a conveying mechanism of the above type wherein the movements imparted to the containers are obtained by devices which have only a vertical movement, while the container is caused to travel in a direction substantially at right angles to the vertical movement of said conveying devices.

A further object of the invention is to provide a conveying mechanism of the above type wherein the devices for conveying the containers are arranged in groups so that a plurality of containers may be rolled forward and backward at the same time.

A still further object of the invention is to provide a conveying mechanism of the above type, wherein the containers are supported by the devices which roll the containers back and forth, and wherein the casing in which the conveying apparatus is located, is free from partitions which are likely to cause a clogging of the movement of the containers.

A still further object of the invention is to provide a conveying apparatus of the above type wherein the amount of vertical lift given to the devices which agitate and convey the containers can be adjusted for varying the extent of agitation given to the containers.

A still further object of the invention is to provide a conveying apparatus of the above type wherein the containers are supported and moved forward and back by bars which are relatively narrow and arranged in groups of three or more.

A still further object of the invention is to provide a conveying apparatus of the above type wherein the containers are moved first along one level and then along a lower level across the casing, and wherein means is provided so that the supporting bars at any level may be readily removed for getting access to a container, which for any reason, becomes clogged in its travel.

A further object of the invention is to provide a conveying apparatus of the above type wherein the containers are supported solely by vertically movable horizontal bars which not only support the containers, but move the containers in a forward direction, thus producing an apparatus for treating food products in containers, which takes up comparatively little space and thereby a maximum number of containers may be handled and treated per cubic foot of space occupied.

A still further object of the invention is to provide an apparatus for treating containers wherein the conveying mechanism for the containers may be adjusted in its operation so as to vary the agitation imparted to the containers for different classes of food products contained therein, and the extent of agitation reduced so that the agitation is so slight as not to in any way cloud the liquor in certain varieties of food products.

A still further object of the invention is to provide a conveying apparatus of the above type which may be so adjusted that the container may be moved continuously in a forward direction by an intermittent step motion, if so desired.

A still further object of the invention is to provide an apparatus of the above type, wherein the containers when passed from one level to another, are handed down rather than dropped, and, therefore, excessive agitation avoided.

These and other objects will in part be obvious and will in part be hereinafter more fully disclosed.

In the drawings which show by way of illustration one embodiment of the invention—

Fig. 2 is a view showing partly in section and partly in end elevation, a portion of the supporting and conveying means;

Fig. 3 is a view partly in section and partly in plan showing the conveying means;

Fig. 4 is an enlarged sectional view through a portion of the apparatus, and showing the manner of supporting and rolling the containers;

Fig. 5 is a view similar to Fig. 4, but showing the supporting devices and the containers in a different position;

Fig. 6 is a view similar to Fig. 5, but showing the supporting devices and containers in still another position;

Fig. 7 is a perspective view of a portion of one of the lifting frames, and a portion of the supporting bars on one level and one of the guide devices for the bars;

Fig. 8 is a view partly in section and partly in side elevation on an enlarged scale showing the operating mechanism for lifting the bars to cause the containers to move back and forth;

Fig. 9 is a view similar to Fig. 8, but showing the operating eccentrics as having been given a quarter revolution in a forward direction;

Fig. 10 is a view similar to Fig. 9, but showing the eccentrics as having been given one-eighth of a revolution in a backward direction;

Fig. 11 is a view similar to Fig. 10, but showing the eccentrics as again given a quarter revolution in a forward direction; the retrograde moving ratchet device being omitted;

Fig. 12 is a view similar to Fig. 10, but showing the eccentrics as having been rotated backwardly one-eighth of a revolution, the ratchet wheel for turning the eccentrics in a forward direction being omitted, and Fig. 13 is a view partly in section and partly in plan showing the operating mechanism for the eccentrics.

Figure 1:
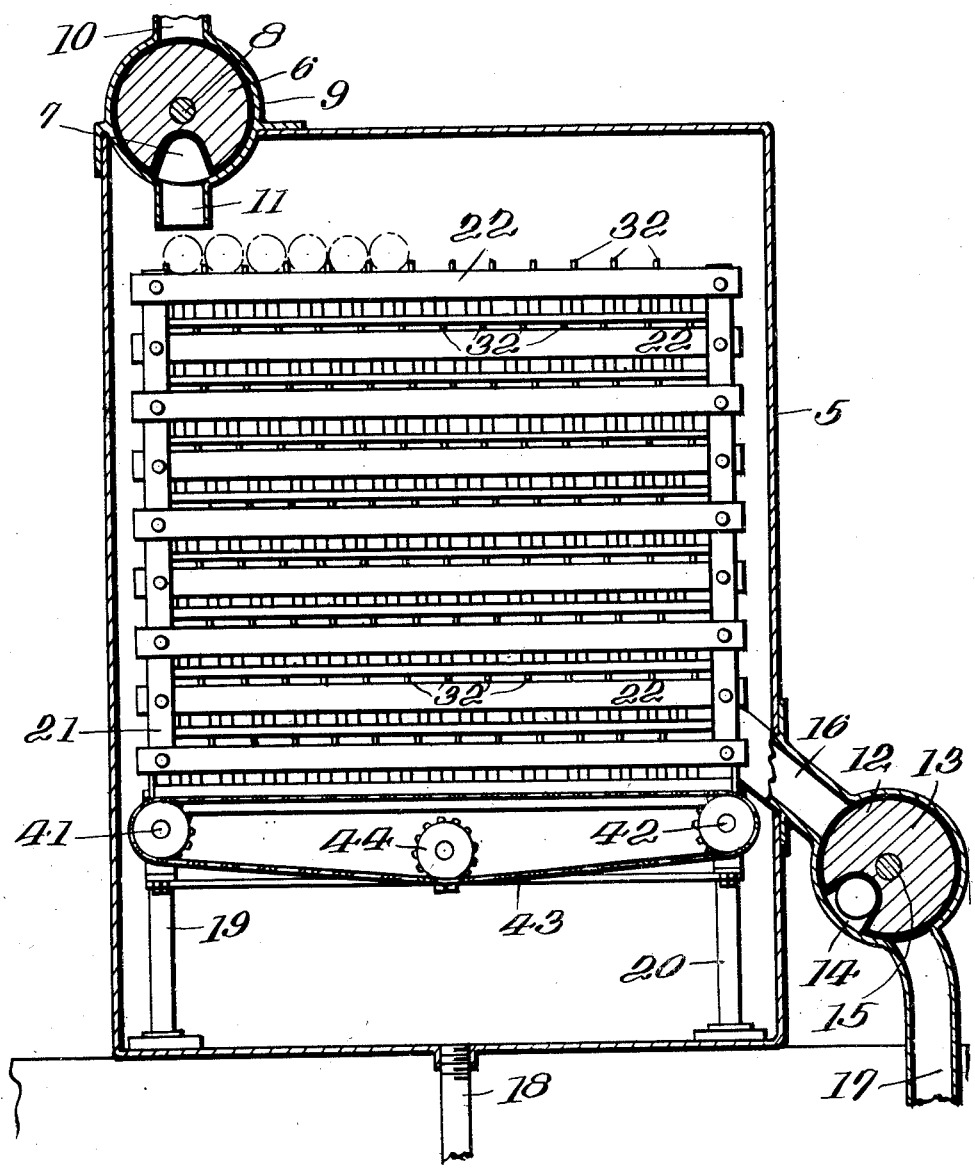
Figure 1 is a view showing more or less diagrammatically and in vertical section, an apparatus embodying one form of the invention.

The apparatus includes a casing, which, in the present embodiment of the invention, may be heated for heat treating the food products. It is also provided with inlet and outlet valves so that the casing may be put under pressure for obtaining a high temperature.

The invention is directed particularly to the conveying mechanism which receives the containers after they have been delivered into the casing and conveys the containers back and forth in the casing, and then delivers the containers to the outlet or discharge means. This conveying mechanism is mounted on a suitable framework and consists of a series of groups of bars. Each bar is relatively narrow, and the bars are spaced from each other slightly. The bars are arranged in groups. There are four bars in each group in the present embodiment of the invention. The bars in each group are independently raised and lowered in a vertical plane, and this is the only movement given to the bars. The bars are so timed in their movements that they move up and down at different timed intervals, and thus the container is engaged by a rising bar and caused to roll forward, the bars in front of the container being either lowered or lowering to permit of the forward movement of the container. The bars are preferably so timed that after the container has rolled forward to a certain extent, then the time of lifting the bars is changed so that the bar in front of the container will rise, while the bar in rear of the container drops, and thus the container is rolled backward for a certain extent of movement. The backward movement of the container, however, is much less than the forward movement, so that the resulting movement of the container is a progressive movement in a forward direction. The bars are much longer than the containers, so that a series of containers may be placed on and supported by the bars at the same time. There are no partitions between the bars, one container being end to end against the next container, and thus it is that the conveying mechanism has a capacity for handling a great number of containers in a comparatively small space. There are end partitions, of course, to keep the containers on the bars. There are a number of levels, and after the containers have passed across on one level, they are discharged on to the next level and returned, and so on back and forth across the casing. Inasmuch as the only moving means which causes the containers to roll in a forward direction are these bars on which they are supported, the bars on one level may be placed comparatively close to the bars on another level, and thus again it is that my improved conveying mechanism has a capacity for handling a great number of containers in a comparatively small casing.

Referring more in detail to the drawings, my improved apparatus for treating food products consists of an outer casing 5 which may be made of any suitable material. This casing 5 is provided with an inlet valve 6 having a recess or pocket 7 formed therein. The valve is mounted on a shaft 8 which can be rotated by any suitable mechanism. This valve is mounted in a cylindrical casing 9 secured to the main casing 5. The casing 9 is provided with an inner passage 10 through which the containers to be treated are fed to the pocket 7, and as the valve rotates, the containers will be discharged from the pocket 7 through the outlet sections of the casing 9 on to the conveying mechanism. The casing 5 is also provided with an outlet valve consisting of a rotating member 12 mounted on a shaft 13 likewise rotated by any suitable mechanism. This outlet valve is provided with a pocket 14. The valve is located in a casing 15 secured to the main casing 5. The containers are discharged from the conveyor into a chute 16 leading to the valve 12, and the valve 12 discharges the containers into a chute 17 which leads the containers to any desired place. Any suitable means may be provided for heating the casing 5. I have shown in the drawings a pipe 18 through which steam can be discharged into the casing, and a suitable outlet may be provided so that the casing is supplied with the heating fluid under pressure. The valves permit of the casing 5 being maintained at a pressure considerably in excess of atmospheric pressure. It is obvious, of course, that this casing may be subjected to a cooling temperature, if desired. The invention is directed particularly to the conveying means.

My improved conveying means for the containers consists of supporting standards 19 and 20. Mounted on these standards are cross beams 23, 23 and attached to the cross beams and extending lengthwise of the frame, are plates 23$^a$. Mounted on the cross beams are vertical brackets 24, 24, each pair of brackets carrying a plate 25. Attached to these plates 25, at each end of the frame, are standards 26. The standards 26 are connected to the ends of recessed guide members 30, which are in turn connected to the plate 25 as shown in Fig. 4. These standards 26 support an end plate 22$^a$ to which are attached depending members 22$^b$ carrying other end plates which are for the purpose of closing the ends of the framework. Mounted on the stardards 26 are angle brackets 21$^a$ which carry side bars 22 and depending members 21 carrying further side bars extending along the sides of the frame and hold the supporting bars hereinafter described in place.

The improved conveying mechanism includes a means whereby the containers are conveyed across the casing, first at one level, and then handed down to the next level, and then back across the casing and so on back and forth across the casing. The mechanism for conveying the containers at each level is similar, and therefore, it will only be necessary to describe in detail the mechansm located at one level and the means for operating the same. I have already referred to the recessed guide members used for the conveying mechanism at the lowest level. There is a pair of these guide members at each side of the frame, and a pair of guide members at each level. The recesses in the guide members are indicated at 31. These recesses are spaced from each other, and located in the recesses are supporting bars 32 for the containers. These bars extend from side to side of the apparatus, and they are free to move up and down in the recesses 31. The supporting bars are raised and lowered by control bars 1, 2, 3 and 4. Each bar is provided with pins 33 which pass up through openings in the guide bars and engage the under face of the supporting bars for lifting the same. The supporting bars are not lifted above the guiding recesses, so that said guide bars control the vertical movement of the bars in the recesses. The lowermost guide bar rests at each side of the supporting frame on angle plates 27. Each angle plate is provided with an opening 29, and the lowermost bar is provided with a depending pin 28 which extends through said opening, and the pin 28 prevents the control bar from endwise movement, but permits the same to move freely vertically. These supporting bars 32 form a floor on which the containers are supported and also forms the active means for moving the containers back and forth and conveying them through the casing. It is understood that the guide bars 30 are arranged along the sides of the framework as shown in Fig. 3, and therefore, the conveying apparatus is entirely free above these supporting bars from one guide bar to the other. Immediately above the guide bars are guide plates 33$^a$ which guide the containers in their forward and backward movement, so that the containers are placed end to end, and as apparent from Fig. 3, a number of containers will be supported in axial alinement with each other. Inasmuch as there are no partitions or conveying devices engaging the ends of the containers, and the containers can be put end in substantial contact, I have provided a conveying mechanism which has a capacity for conveying a great number of ontainers in a compartively small space.

The bars 32 which support the containers are arranged in groups. These bars are relatively narrow, and the spaces between the bars are relatively narrow, so that the group of four bars is even less in width than the diameter of the containers conveyed thereby. The supporting bars are raised and lowered by the four control bars therefor, and these control bars are so manipulated that the supporting bars are raised and lowered in such timing whereby the bar in rear of a container will be raised while the remaining bars of the group are substantially at their lower position, and the container will, therefore, roll along the supporting bars for a certain distance. The rolling movement of the container will be limited by the bar in the next group which is raised in timing with the bar which caused the container to roll. Thus it is by the raising of certain of the bars and the lowering of other bars at the same time, the containers are caused to roll forward. The timing of the bars is preferably such that when the container has rolled forward to a certain extent, then the bar adjacent the front of the container in its direction of movement is raised, while the bar in rear of the container is lowered, and thus the container rolled backward to a certain extent. The extent of backward movement, however, is less than the extent of forward movement, so that the container is progressed through the machine and thus conveyed through the chamber formed by the casing. The purpose of this rolling of the container back and forth is for agitating the contents of the container. When the bars are of proper dimensions relative to the diameter of the container, the container may not only be rolled back and forth, but may be raised and lowered. That is, if the bar adjacent the front of the container is up or part way up, and in engagement with the container, when the supporting bar immediately in rear of the container raises into engagement therewith, the container may be lifted off from the intermediate parts, but it will drop on to the supporting bars beneath the same as the advance bar is lowered. I merely refer to this as it is an additional means of agitation which may be accomplished by my improved conveying means. In the drawings, the containers are indicated in broken lines at C.

In Fig. 4, a section is taken through one end of the conveying apparatus, and the method of delivering the containers from one level to another is clearly illustrated. The containers travel in the direction of the arrow indicated in this figure, and the advance container in the upper level is about to be delivered on to the supporting and conveying devices in the next lower level. When the supporting bar $32^2$ (Fig. 5) is raised, it engages this advance container, and rolls it off from the bars $32^3$ and $32^4$. The supporting bar $32^1$ (Fig. 4) brought the container to the position for the bar $32^2$ to effect this result. The container C which was rolled off from the last bar $32^4$ drops into a pocket at the end of the conveyor, and the forward movement of the container is limited by a stationary end plate 34. The container is limited in its downward movement through the action of gravity by a supporting bar $32^a$. This bar $32^a$ is mounted on brackets 35 attached to the bar $32^1$ of the next lower level. When the container first drops into the pocket referred to, this bar $32^a$ is in raised position as shown in Fig. 4, and when the bar $32^1$ moves down, then the container will roll down on to the supporting bars 32 in the next lower level. The supporting bars 32 in the next lower level are likewise raised and lowered by control bars 1, 2, 3 and 4. The control bars 1 of the different levels are secured together by angle brackets 36, 36 and the lowermost bar 1 of this group or frame which carries all of the parts, rests on an operating eccentric 37. There is an operating eccentric 37 at each end of the apparatus. The operating eccentrics 37 are mounted upon actuating shafts, and as the shafts rotate, they will raise and lower the frame carrying the bars 1. It will be understood that there is a supporting frame for the No. 2 control bars, and these No. 2 control bars are supported on eccentrics 38. There is also a supporting frame for the No. 3 control bars, and this frame is supported on eccentrics 39. There is likewise a supporting frame for the No. 4 control bars, and this frame is supported on eccentrics 40.

It will be clear from Fig. 2 that there are a group of eccentrics 37, 38, 39 and 40 at each end of the shaft 41 which supports these eccentrics. There is also a group of eccentrics at each end of the shaft 42. The control bars at one side of the machine rest on corresponding eccentrics mounted on these two shafts, while the control bars at the other side of the machine rest on corresponding eccentrics at the other end of the shafts. The two shafts are geared together by a sprocket chain 43. This sprocket chain runs over sprocket wheels carried by the shafts and over an idler sprocket wheel 44. Thus it is that the two shafts are driven in unison and the eccentrics moved in proper timing with each other.

The shafts are actuated by the mechanism shown in detail in Figures 8 to 13. This mechanism consists of a main shaft 45 mounted in suitable bearings carried by the frame supporting the conveying mechanism. On this shaft 45 are two eccentrics 46 and 47. The main shaft 45 is continuously rotated in the direction of the arrow indicated in the above figures. An eccentric strap 48 cooperating with the eccentric 46 is pivotally connected to an arm 49 which is freely journaled on the shaft 41. This arm 49 carries a pawl 50 which cooperates with a ratchet wheel 51 fixed to the shaft 41. Cooperating with the eccentric 47 is an eccentric strap 52. This eccentric strap is pivoted to an arm 53 which is also freely journaled on the shaft 41 and carries a pawl 54 cooperating with a ratchet wheel 55 fixed to the shaft 41. Springs operating upon the ratchets hold them in engagement with the ratchet wheels. The teeth of the ratchet wheels are faced in opposite directions, and the pawls are so set that when the eccentric straps are moved in one direction, one of the ratchet wheels becomes active to effect a partial rotation of the shaft 41, and when the eccentric straps are moved in the opposite direction, then the other ratchet wheel becomes effective to impart a partial rotation to the shaft 41.

Referring to Fig. 8 of the drawings, it will be noted that the eccentric 37 controlling the bars numbered 1 is uppermost, and has raised its bar with which it cooperates. The eccentric 38 is set at ninety degrees from the eccentric 37, and the eccentric 39 is set at one hundred and eighty degrees from the eccentric 37, while the eccentric 40 is set two hundred and seventy degrees from the eccentric 37. The eccentrics 46 and 47 together with the ratchet wheels are so proportioned, that when the main shaft rotates through a half revolution from the position shown in Fig. 8 to the position shown in Fig. 9, it will impart a rotation to the shaft 41 through an arc of ninety degrees, the pawl 50 being effective to accomplish this movement of the shaft 41. When the main shaft completes its revolution, it will then move the eccentric straps so that the ratchet wheel 55 becomes effective to turn the shaft 41 backward, or in a direction counter-clockwise as viewed in these figures.

Owing to the throws of the two eccentrics 46 and 47, the retrograde movement of the shaft 41 is only through one-eighth of a revolution, as indicated in Fig. 10. On the next semi-rotation of the main shaft, the eccentrics are turned to the position shown in Fig. 11. This gives the eccentrics a one-quarter rotation in a clockwise direction. When the main shaft completes its second revolution, then the eccentrics are turned in a counter-clockwise direction, but only through one-eighth of a revolution. In the two revolutions of the main shaft, the shaft 41 has been given a one-quarter revolution. The results have been that the eccentrics have been moved first clockwise, and then counter-clockwise, and this results in a lifting of the controlling bars in such an order that the supporting bars for the containers will be raised and lowered in such timing as to cause the containers to roll forward through a certain extent of movement, and then roll backward through a certain extent of movement. Inasmuch as the rotation imparted to the shaft 41 is greater in a clockwise direction than in a counter-clockwise direction, it will be apparent that the container will roll forward to a greater extent than it does backward, and therefore, the container is moved forward or progressed through the machine. It will be understood, of course, that this means for imparting back and forth movements to the actuating shafts for the control bars may be greatly varied, and may be varied as to its timing. I have described one method of operation in order to make clear the operation of my improved conveying mechanism.

It will be noted from the above that I have provided a conveying mechanism for the containers, wherein the containers are moved solely through the action of bars moving in a vertical direction, and the resulting effect upon the containers is a backward and forward movement, and a progressive forward movement in a direction at right angles, or substantially so, to the plane of movement of the bars. It will be understood, of course, that the supporting bars on the different levels may be arranged so that gravity may assist in the movement of the containers, by arranging the bars so that the effective forward travel of the container is downward. I prefer, however, to have this effective path of travel substantially horizontal, as it aids in the easy back and forth movement of the container. It will be noted that when the containers pass from one level to another, that they do not drop from the supporting bars on one level to the supporting bars on the next lower level, but are in a measure, handed down by the bar at the end of the next lower level which is located above, but movable with, the bars in said next lowest level. The supporting bars are not in any way connected to the control bars therefor, but are engaged by pins fixed to the control bars. The control bars when they are in their lowest position, are supported on the angle bars 27, and the eccentrics move out of contact with the lowest control bar. By placing washers or the like between these angle bars 27 and the control bars, the extent of downward movement of the control bars, and consequently the extent of downward movement of the supporting bars can be varied. Thus it is that the extent of up and down movement imparted to the supporting bars may be varied, and the agitation imparted to the containers varied.

The arm 53 is provided with a slot 53$^a$, and the pitman 52 is connected to a bolt 53$^b$ which is adjustable in said slot. By adjusting this bolt 53$^b$ toward or from the center of the shaft 41, the extent of movement imparted to the pawl 54 by a semi-rotation of the eccentric 47, will be varied. The arm 49 is likewise provided with a slot 49$^a$ and a pin 49$^b$ adjustable therein, connects the eccentric strap 48, to said arm 49. By adjusting this pin 49$^b$, the throw imparted to the pawl 50 may be varied. By the above adjustments, the relative extent of backward movement to the forward movement may be changed and thus the amount of backward movement of the container reduced, if desired, so that the containers move forward a step, then practically come to a stop and then move forward again, without any backward movement. This movement of the containers can also be accomplished by putting out of action the ratchet or pawl which steps the shaft backward. By substituting a different driving mechanism, the shaft 41 may be driven continuously in a clockwise direction, and thus the containers move in a forward direction only, without any backward movement. Even when the movement is in a forward direction only, agitation can be given to the containers by a lifting of the containers as the bars move up and down, and the causing of the containers thereby to travel in a wavelike path.

While I have described the bars as operated so as to move the container backward, it will be understood that from certain aspects of the invention, the bars may be moved so as to impart to the containers a forward movement only. The operating mechanism for the bars may be adjusted so that the containers are moved forward and then come to a standstill, and then move forward, or the containers may be moved forward, then slightly rearward, and then again forward, and the extent of rearward movement may be varied. Likewise, the containers may be raised and lowered in their movement through the treating apparatus. Through these various adjustments, the agitation imparted to the contents of the container may be varied to suit the class of food products contained in the containers, and in certain varieties of foods packed, the agitation may be so slight as not to in any way cloud the liquor in the containers. By handing the containers down from one level to another through these intermediate bars, excessive agitation is avoided when the containers are transferred from one level to another.

The supporting bars for the containers can be readily removed by sliding the same endwise from the guide bars therefor. If there is a jam or clog in the travel of the containers, a door or bracket at the side of the supporting frame can be opened, so that access may be had to the bars and the bars removed in the region of the clogging of the travel of the containers, and after the jammed container is taken from the apparatus, the bars can be replaced and the machine is in condition for further operation.

Having thus described the invention, what I claim as new and desire to secure by Letters-Patent, is—

1. An apparatus for treating food products in closed containers comprising a casing, mechanism for supporting and rolling the containers forward and backward, but to a greater extent forward, so that the containers are thus conveyed through the casing, said mechanism including groups of bars, and means for independently raising and lowering the bars in each group.

2. An apparatus for treating food products in closed containers comprising a casing, mechanism for supporting and rolling the containers forward and backward, but to a greater extent forward, so that the containers are thus conveyed through the casing, said mechanism including groups of bars, and means for moving said bars independently and vertically only for causing the containers resting thereon to roll.

3. An apparatus for treating food products in closed containers comprising a casing, mechanism for supporting and rolling the containers forward and backward, but to a greater extent forward, so that the containers are thus conveyed through the casing, said mechanism including groups of bars, each bar being very much narrower than the diameter of the container so that the container may be engaged by a plurality of bars at the same time, and means for independently raising and lowering said bars in each group in a vertical direction only.

4. An apparatus for treating food products in closed containers comprising a casing, mechanism for supporting and rolling the containers through the casing comprising spaced recessed guide bars extending lengthwise of the casing, said recesses being spaced from each other, supporting bars freely mounted in said recesses whereby the same may be raised and lowered independently of each other, said bars being arranged in groups, and means for independently raising and lowering the bars in each group, said means including devices whereby said bars may be manipulated so that the containers are rolled forward, then backward, then forward, and to a greater extent forward than backward, so that the containers are progressed through the casing.

5. An apparatus for treating food products in closed containers comprising a casing and means for supporting and conveying the containers through said casing, said mechanism including a guide bar at each side of the casing, said guide bars having spaced recesses, supporting bars for the containers extending from one side of the casing to the other, said casing having guiding members above the guide bars for preventing endwise movements of the containers beyond the guide bars, but being free from guiding members intermediate the guide bars so that the containers may be moved through the casing in axial alinement and end to end, and means for raising and lowering said bars in a vertical direction only for moving the container forward, then backward, and then forward, but to a greater extent in a forward direction.

6. An apparatus for treating food products in closed containers, comprising a casing, a supporting frame in said casing, spaced guide bars carried by said frame and extending from one end of the frame to the other, said guide bars having spaced recesses therein, supporting bars located in said recesses on which the containers are supported and moved, and means for raising and lowering said supporting bars in timing so as to move the containers forward, then backward, and then forward, and to a greater extent in a forward direction so that the container is conveyed through the casing.

7. An apparatus for treating food products in closed containers comprising a casing, a supporting frame in said casing, spaced guide bars carried by said frame and extending from one end of the frame to the other, said guide bars having spaced recesses therein, supporting bars located in said recesses on which the containers are supported and moved, and means for raising and lowering said supporting bars in timing so as to move the containers forward, then backward, and then forward, and to a greater extent in a forward direction so that the container is conveyed through the casing, said last-named means including lifting bars, each of which operates devices for lifting certain of said supporting bars, a rotating shaft at each end of the supporting frame, and eccentric members mounted on said shafts and supporting and actuating said lifting bars.

8. An apparatus for treating food products in closed containers comprising a casing, a supporting frame in said casing, spaced guide bars carried by said frame and extending from one end of the frame to the other, said guide bars having spaced recesses therein, supporting bars located in said recesses on which the containers are supported and moved, means for raising and lowering said supporting bars in timing so as to move the containers forward, then backward, and then forward, and to a greater extent in a forward direction so that the container is conveyed through the casing, said last-named means including lifting bars, each of which operates devices for lifting certain of said supporting bars, a rotating shaft at each end of the supporting frame, and eccentric members mounted on said shafts and supporting and actuating said lifting bars, and means for intermittently rotating said shafts, first in one direction and then in the other.

9. An apparatus for treating food products in closed containers comprising a casing, a supporting frame disposed in said casing and extending substantially from end to end thereof, a guide bar at each side of said supporting frame, said guide bars having spaced recesses, supporting bars for the containers mounted in said recesses, said bars being arranged in groups, lifting bars extending from end to end of said frame at each side thereof and having devices for engaging said supporting bars for lifting the same, and means for raising and lowering said lifting bars so that the supporting bars in each group are independently raised and lowered.

10. An apparatus for treating food products in closed containers comprising a casing, a supporting frame disposed in said casing and extending substantially from end to end thereof, a guide bar at each side of said supporting frame, said guide bars having spaced recesses, supporting bars for the containers mounted in said recesses, said bars being arranged in groups, lifting bars extending from end to end of said frame at each side thereof and having devices for engaging said supporting bars for lifting the same, means for raising and lowering said lifting bars so that the supporting bars in each group are independently raised and lowered, said supporting bars for the containers extending from side to side of the frame and adapted to support a series of containers in axial alinement with their ends substantially in contact.

11. An apparatus for treating food products in closed containers comprising a casing, a framework extending from end to end and side to side of said casing, said framework having a guide bar at each side thereof extending throughout the length of the framework, said guide bars having spaced recesses, supporting bars for the containers located in said recesses and extending from side to side of said frame, said supporting bars being arranged in groups, a lifting bar having devices for engaging and raising and lowering certain of the supporting bars in each group, there being an independent lifting bar for each supporting bar in the groups, an actuating shaft at each end of said frame, and eccentric members mounted on said shaft and adapted to engage said lifting bars for raising and lowering the same.

12. An apparatus for treating food products in closed containers comprising a casing, a framework extending from end to end and side to side of said casing, said framework having a guide bar at each side thereof extending throughout the length of the framework, said guide bars having spaced recesses, supporting bars for the containers located in said recesses and extending from side to side of said frame, said supporting bars being arranged in groups, a lifting bar having devices for engaging and raising and lowering certain of the supporting bars in each group, there being an independent lifting bar for each supporting bar in the groups, an actuating shaft at each end of said frame, eccentric members mounted on said shaft and adapted to engage said lifting bars for raising and lowering the same, and angle bars for supporting the lifting bars when in their lowermost position.

13. An apparatus for treating food products in closed containers comprising a casing, a framework extending from end to end and side to side of said casing, said framework having a guide bar at each side thereof extending throughout the length of the framework, said guide bars having spaced recesses, supporting bars for the containers located in said recesses and extending from side to side of said frame, said supporting bars being arranged in groups, a lifting bar having devices for engaging and raising and lowering certain of the supporting bars in each group, there being an independent lifting bar for each supporting bar in the groups, an actuating shaft at each end of said frame, eccentric members mounted on said shaft and adapted to engage said lifting bars for raising and lowering the same, and angle bars for supporting the lifting bars when in their lowermost position, each angle bar having a vertical passageway therethrough, and guide pins carried by the lifting bars and engaging said passages.

14. An apparatus for treating food products in closed containers comprising a casing, a framework extending from end to end and side to side of said casing, said framework having a guide bar at each side thereof extending throughout the length of the framework, said guide bars having spaced recesses, supporting bars for the containers located in said recesses and extending from side to side of said frame, said supporting bars being arranged in groups, a lifting bar having devices for engaging and raising and lowering certain of the supporting bars in each group, there being an independent lifting bar for each supporting bar in the groups, an actuating shaft at each end of said frame, eccentric members mounted on said shaft and adapted to engage said lifting bars for raising and lowering the same, angle bars for supporting the lifting bars when in their lowermost position, and means for intermittently rotating said actuating shafts, first in a forward direction and then in a backward direction and then forward, but to a greater extent in a forward direction, so that the containers while rolled back and forth on the supporting bars are rolled in a forward direction and conveyed through the casing.

15. An apparatus for treating food products in closed containers comprising a casing, a supporting frame located in said casing, and extending from end to end and side to side thereof, said supporting frame having a series of spaced guide bars forming levels along which containers may be conveyed, said guide bars having spaced recesses, and a supporting bar for the containers located in each recess, said supporting bars being arranged in groups, means for independently raising and lowering the bars in each group, so that the containers may be rolled forward, then backward, and then forward, and to a greater extent in a forward direction, whereby they are caused to pass across the supporting bars on one level, and are then delivered to the supporting bars on the level below, where they are again caused to move across the supporting bars to the other end of the casing.

16. An apparatus for treating food products in closed containers comprising a casing, a supporting frame located in said casing, and extending from end to end and side to side thereof, said supporting frame having a series of spaced guide bars forming levels along which containers may be conveyed, said guide bars having spaced recesses and a supporting bar for the containers located in each recess, said supporting bars being arranged in groups, means for independently raising and lowering the bars in each group, so that the containers may be rolled forward, then backward and then forward, and to a greater extent in a forward direction, whereby they are caused to pass across the supporting bars on one level, and are then delivered to the supporting bars on the level below, where they are again caused to move across the supporting bars to the other end of the casing, and a handing down supporting bar located between the two levels for receiving the containers when they roll off from the supporting bars on one level, and for directing the containers on to the next level.

17. An apparatus for treating food products in closed containers comprising a casing, mechanism for supporting and rolling the containers through a casing including groups of bars, each bar being of less width than the diameter of the containers and serving as the sole supporting means for the containers, and means for raising the bars in each group in different timed relation to each other for rolling the containers along the supporting bars.

18. An apparatus for treating food products in closed containers comprising a casing, mechanism for supporting and rolling the containers through a casing including groups of bars, each bar being of less width than the diameter of the containers and serving as the sole supporting means for the containers, and means for raising the bars in each group in different timed relation to each other for rolling the containers along the supporting bars, said bars being timed so as to control the forward rolling of the containers and so as to cause the containers to be lifted and lowered as they are moved along by the supporting bars.

In testimony whereof, I affix my signature.

JOHN COYLE.